(12) United States Patent
Hurni et al.

(10) Patent No.: US 9,327,855 B2
(45) Date of Patent: May 3, 2016

(54) FEEDING DEVICE FOR PACKAGING MACHINE

(71) Applicant: Robert Bosch GmbH, Stuttgart (DE)

(72) Inventors: Marc Hurni, Schaffhausen (CH); Hansruedi Wanner, Gächlingen (CH); Philipp Kathan, Langwiesen (CH); Markus Landolt, Hallau (CH); Alfred Wipf, Jestetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/408,150

(22) PCT Filed: May 3, 2013

(86) PCT No.: PCT/EP2013/059225
§ 371 (c)(1),
(2) Date: Dec. 15, 2014

(87) PCT Pub. No.: WO2013/189656
PCT Pub. Date: Dec. 27, 2013

(65) Prior Publication Data
US 2015/0136564 A1    May 21, 2015

(30) Foreign Application Priority Data
Jun. 19, 2012  (DE) .......................... 10 2012 210 329

(51) Int. Cl.
*B65G 47/26* (2006.01)
*B65B 35/44* (2006.01)
(Continued)

(52) U.S. Cl.
CPC ................. *B65B 35/44* (2013.01); *B65B 35/24* (2013.01); *B65B 35/50* (2013.01); *B65B 57/16* (2013.01); *B65G 47/082* (2013.01); *B65G 47/28* (2013.01); *B65G 47/30* (2013.01); *B65B 9/06* (2013.01)

(58) Field of Classification Search
CPC ... B65G 47/841; B65G 47/844; B65G 47/845
USPC ........................................ 198/419.3
See application file for complete search history.

(56) References Cited

U.S. PATENT DOCUMENTS 4,552,261 A * 11/1985 Raudat .................... B65B 21/06
                                                      198/419.3
5,657,615 A *  8/1997 Muller ................. B65G 17/123
                                                      198/419.3

(Continued)

FOREIGN PATENT DOCUMENTS

DE     102008040204     1/2010
DE     102009029314     8/2010
(Continued)

OTHER PUBLICATIONS

International Search Report for Application No. PCT/EP2013/059225 dated Jul. 11, 2013 (English Translation, 3 pages).
(Continued)

*Primary Examiner* — James R Bidwell
(74) *Attorney, Agent, or Firm* — Michael Best & Friedrich LLP

(57) ABSTRACT

A feeding device for feeding products (12*a-k*) and/or stacks of products (14*a-k*) to a packaging process of a packaging machine (16*a*, 16*d-k*), in particular of a horizontal tube packaging machine, comprises a guide unit (22*a-k*) which is disposed as a closed loop (18*a*, 18*c-k*) and on which a plurality of arranged conveyor elements (22*a-k*) are arranged so as to be drivable mutually independently in a speed- and/or position-controlled manner at least along at least one working section (24*a*, 24*c-d*, 24*f-k*) of the guide unit (20*a-d*, 20*f-k*). At least one conveyor element (22*a-k*) has a holder (26*a-k*), and at least one conveyor element (22*a-k*) that follows contrary to a conveying direction (28*a*, 28*c-k*) has a counter holder (30*a-k*).

12 Claims, 6 Drawing Sheets

(51) Int. Cl.

| | | |
|---|---|---|
| *B65G 47/08* | (2006.01) | |
| *B65G 47/28* | (2006.01) | |
| *B65B 57/16* | (2006.01) | |
| *B65B 35/24* | (2006.01) | |
| *B65B 35/50* | (2006.01) | |
| *B65G 47/30* | (2006.01) | |
| *B65B 9/06* | (2012.01) | |

(56) References Cited

U.S. PATENT DOCUMENTS

| | | | | |
|---|---|---|---|---|
| 5,893,701 A * | 4/1999 | Pruett | ................. | B65B 23/14 198/419.1 |
| 6,191,507 B1 | 2/2001 | Peltier et al. | | |
| 7,942,254 B2 * | 5/2011 | Schell | ................. | B31D 3/007 198/419.3 |
| 8,162,130 B2 * | 4/2012 | Rabec | ................. | B65G 47/29 198/418.7 |
| 2004/0011625 A1 * | 1/2004 | Malini | ................. | B65B 21/06 198/419.3 |
| 2006/0049022 A1 | 3/2006 | Johansson et al. | | |
| 2013/0026005 A1 | 1/2013 | Senn | | |

FOREIGN PATENT DOCUMENTS

| | | |
|---|---|---|
| EP | 2045187 | 4/2009 |
| EP | 2364916 | 9/2011 |
| WO | 03047977 | 6/2003 |
| WO | 03105324 | 12/2003 |
| WO | 2006024460 | 3/2006 |
| WO | 2008022296 | 2/2008 |

OTHER PUBLICATIONS

Beckhoff Automation GmbH—"Drive Technology—Rethought. XTS. eXtended Transport System" Product Brochure—[scanned version of Hardcopy] Apr. 2012.

"Novel linear motor system 'will open up new machine concepts'" Drives & Controls—[Online] Apr. 30, 2012 Retrieved from the internet http://www.drivesncontrols.com/news/archivestory.php/aid/3495/Nove_linear_motor_system_%60will_open_up_new_machine_concepts%60.html [retrieved Feb. 20, 2015].

"Hannover Messe: Extended transport drive system Beckhoff's XTS drive system combines rotary and linear systems for mechanical engineers" Plant Engineering [Online] Apr. 26, 2012 Retrieved from the internet http://www.drivesncontrols.com/news/archivestory.php/aid/3495/Nove_linear_motor_system_%60will_open_up_new_machine_concepts%60.html [retrieved Feb. 20, 2015].

Michael Kleine, "Der lineare Kreis" K-Magazin—[Online] Apr. 2012, Retrieved from the internet http://www-k-magazin.de/index.cfm?pid=1465&pk=119361#.VQBor1c_xtF [retrieved Feb. 20, 2015].

Beckhoff Automation GmbH & Co. KG "XTS. The Linear Transport System of Beckhoff", Youtube—[Online], Jun. 6, 2012, Retrieved from the internet https://www.youtube.com/watch?v=GQsnjFTG26U [retrieved Feb. 26, 2015].

Beckhoff Automation GmbH & Co. KG "Hannover Messe 2012, Day 1: Beckhoff Trade Show TV", Youtube—[Online], Apr. 24, 2012 Retrieved from the internet https://www.youtube.com/watch?v=85wftCWW-Qw [retrieved Feb. 26, 2015].

Beckhoff Automation GmbH & Co. KG "Hannover Messe 2012, Day 2: BeckhoffTrade Show TV", Youtube—[Online] Apr. 24, 2012 Retrieved from the internet https://www.youtube.com/watch?v=pVVRCUCcd6A [retrieved Feb. 26, 2015].

Beckhoff Automation Canada—"Hannover Messe 2012. Beckhoff Automation XTS conveyor concept", DPN—Design Product News (Video)—[Online], Jun. 5, 2012 Retrieved from the internet http://www.dpncanada.com/Video-Library/Trade-Shows-Conferences/Hannover-Messe-2012-Beckhiffs-Automation-XTS-conveyor-concept.html [retrieved Feb. 26, 2015].

Bosch, "Revolutionary Jelly Wrapper & Intelligent Transport System," YouTube, Nov. 8, 2011, https://www.youtube.com/watch?v=EfHXmDFSjD4 (1 page).

* cited by examiner

FEEDING DEVICE FOR PACKAGING MACHINE

BACKGROUND OF THE INVENTION

WO 03/105324 has already made known feeding devices for feeding products and/or product stacks to a packaging process of a packaging machine, in particular a horizontal tube packaging machine, said feeding device having at least one guide unit which is realized as a closed loop along which a plurality of arranged conveyor elements are arranged so as to be drivable in a speed-controlled and/or positionally regulated manner independently of one another at least along at least one operating portion of the guide unit. The conveyor elements in each case convey one product and/or one product stack. Products are supported on one side during conveying. Support on both sides requires format parts which are adapted to a product length and have to be exchanged and/or re-arranged in the case of a change in product length.

SUMMARY OF THE INVENTION

The invention proceeds from a feeding device for feeding products and/or product stacks to a packaging process of a packaging machine, in particular a horizontal tube packaging machine, said feeding device having at least one guide unit which is realized as a closed loop along which a plurality of arranged conveyor elements are arranged so as to be drivable in a speed-controlled and/or positionally regulated manner independently of one another at least along at least one operating portion of the guide unit.

It is proposed that at least one conveyor element comprises a holder and at least one conveyor element which follows in a direction opposite a conveying direction comprises a counter holder. A counter holder can be arranged on a conveyor element that follows in the conveying direction and comprises a holder, in a preferred manner on the next conveyor element following in the conveying direction. A "conveying direction" is to be understood in this context in particular as that direction along the guide unit in which the conveyor elements are circulating when products are fed. The feeding device can be provided in particular for the purpose of moving products and/or product stacks into the packaging process in a synchronized manner at a predefined spacing and at a speed that is adapted to the packaging process. A "product" is to be understood in this context as an object to be packaged or a package to be packed which contains at least one object. A package, in this context, can be, in particular, a film packaging, such as a tubular bag, or a tray. An object can be, in particular, a chunky foodstuff, in a preferred manner a biscuit, in particular a disk-shaped biscuit. In a preferred manner, the feeding device can be provided for the purpose of moving objects and/or trays and/or film packagings which contain objects, and/or stacks of objects and/or trays and/or film packagings into the packaging process. A "product stack" is to be understood in this context in particular as a vertical, or in a preferred manner horizontal, stack which is formed by several products, such as objects and/or packages. It is additionally possible for a product stack to contain several stacks of products, in particular a horizontal product stack can be formed by several vertical stacks of products. A "horizontal tubular bag machine" is to be understood in this context in particular as a packaging machine which is known to the expert as an HFFS "horizontal form fill seal" packaging machine, which is provided for the purpose of forming from a material web at least one film tube about one or several products to be packaged to form a tubular bag and to seal said tubular bag at both ends. In a preferred manner, the horizontal tubular bag machine can be provided for the purpose of creating at least 100 tubular bags/minute, in a particularly preferred manner more than 250 tubular bags/minute. In a preferred manner, the tubular bag machine can be provided for the purpose of creating up to 1000, in a particularly preferred manner up to 1500 tubular bags/minute. Products to be packaged and the film tube formed around the products are, in a preferred manner, moved at least substantially in a horizontal packaging direction during the forming of the tube, the moving of the products to be packaged into the film tube and the sealing of the tube. "At least substantially horizontally" is to be understood in this context in particular as a direction which deviates by less than 60°, in a preferred manner by less than 45°, in a particularly preferred manner by less than 20° from a horizontal which is arranged perpendicular to a weight force. A "conveyor element" is to be understood in this context in particular as an element which is mounted so as to be movable by bearing means of the guide unit and is provided for the purpose of supporting a product and/or a product stack, which is supplied by the feeding device, in at least one direction in at least one operating state, and is in particular a holder and/or counter holder. A "closed loop" is to be understood in this context in particular as a path on which the conveyor elements are circulating. The path can comprise an arbitrary form. In a preferred manner, the path is realized at least substantially as a straight line at least in the region of a feed section and/or a return section. The term "at least substantially" is to be understood in this context as a path deviation to the side of less than 5%, in a particularly preferred manner less than 1% with reference to a path length in the path direction. In a preferred manner, the path comprises in a preferred manner circular turning regions between the feed section and the return section. The guide unit can be particularly compact and cost-efficient. In particular, the feed section can be arranged at least substantially parallel to the packaging direction of the packaging process of the packaging machine. The guide unit can be particularly well suited for feeding products in the packaging direction to the packaging machine. In a further realization, the feed section can be arranged at right angles with respect to the packaging direction. Products and/or product stacks can be moved transversely into the packaging process in a particularly space-saving manner. The expert will establish further, sensible arrangements of the feed section. The path can include means in order to place further conveyor elements into circulation or to remove the same from circulation, such as, in particular, points. In an advantageous manner, an overall number of conveyor elements can be adapted.

In a preferred manner, the feeding device can be arranged on the packaging machine so as to be vertically adjustable. It is possible to compensate for different product heights. The term "height" is to be understood in this context in particular as a direction at least substantially parallel to the weight force. A "feed section" is to be understood in this context in particular as the part of the guide unit which extends from a product takeover region to a product discharging region. A "product takeover region" is to be understood in this context in particular as a region of the guide unit in which the feeding device is loaded with products and/or product stacks. A "product discharging region" is to be understood in this context in particular as a region of the guide unit in which the feeding device discharges the products to the packaging process. An "operating portion" is to be understood in this context in particular as a portion of the feed section in which the conveyor elements are independently drivable in a speed-controlled and/or positionally regulated manner. "Independently" drivable is to be understood in this context in particular as speed required values and/or positional required values of the conveyor elements being able to be adjusted independently within limits within which the conveyor elements are collision-free. In particular, the product takeover region and/or the product discharging region can be an operating portion or part of an operating portion. In a preferred manner conveyor elements can be drivable outside the operating portions in a passive or speed-controlled and/or positionally regulated manner. A "holder" is to be understood in this context in particular as an element which is provided for the purpose of supporting a product or a product stack in the conveying direction in at least one operating state. A "counter holder" is to be understood in this context in particular as an element which is provided for the purpose of supporting a product or a product stack in the direction opposite the conveying direction in at least one operating state. The counter holder can be provided in particular for the purpose of preventing the products and/or product stacks from tipping over in the conveying direction. The conveyor elements can additionally comprise product supports in order to support the products or product stacks against the weight force. In a preferred manner, the feeding device can comprise a support surface which supports the products. In a preferred manner, the guide unit and the conveyor elements are arranged on a side of the support surface remote from the product. The support surface, in a preferred manner, comprises at least one recess which extends in the conveying direction, through which the holders and counter holders protrude on the side of the support surface facing the product. Holders and counter holders of a product or a product group can be moved independently in the conveying direction and in the direction opposite the conveying direction. In the case of product takeover, the holders and counter holders can be moved in a manner adapted to a product takeover process. In particular, where several products are taken over, a spacing between the holders and counter holders can be increased in a manner adapted to a growing number of products. The spacing between holders and counter holders can be adapted to a product length or product stack length. Products or product stacks can be taken over and/or discharged independently in a synchronized manner in the product takeover regions and/or the product discharging regions. A speed in the case of the product takeover and/or product discharging can be particularly high. The speed can be matched particularly well to the preceding or the following process, in particular to the packaging speed and/or a film speed of the packaging machine. The term "separation" is to be understood as a spacing between consecutive holders. The separation of consecutive holders can be adjusted independently. A preliminary section, in which packaging spacings between products or product stacks can be adjusted prior to product takeover, can be omitted. The feeding device can feed products with different product lengths and/or product stack lengths and/or packaging spacings without format changes being necessary. A "format change" is to be understood in this context in particular as a changeover where parts are exchanged and/or adapted as a result of manual intervention, such as in particular adjusted and/or aligned. The feeding device can be particularly efficient and flexible. An overall length of the feeding device can be particularly short. Efficiency of the feeding device can be particularly high.

In addition, it is proposed that at least one conveyor element comprises at least one holder and at least one counter holder. A conveyor element can bear a holder for a product or a product stack and a counter holder for a product or a product stack following in the direction opposite the conveying direction at the same time. In a preferred manner, holders and counter holders can be realized in an integral manner. Conveyor elements can be saved. The feeding device can be particularly cost-efficient. It is possible for just one conveyor element to be arranged between two consecutive products or product stacks. Particularly small spacings between products can be possible.

In addition, at least one support element, which is arranged on the guide unit between two conveyor elements, is proposed. A "support element" is to be understood in particular as an element which is provided for the purpose of supporting a product or product stack in particular in relation to the weight force. In a preferred manner, the support element can be mounted so as to be movable in the conveying direction by the guide unit. The support element can be moved in a passive manner along the conveying direction, in particular by adjoining conveyor elements. The conveyor elements can include means in order to pull and/or push the support element. In a preferred manner, the support element is drivable in a speed-controlled and/or positionally regulated manner. In a preferred manner, at least one support element, in a particularly preferred manner one single support element, is arranged between each conveyor element bearing a holder and the conveyor element following in the conveying direction and bearing a counter holder. In a preferred manner, the support element can and/or the conveyor elements can comprise support surfaces with a comb-like closing edge. The comb-like closing edges of adjacent conveyor elements and/or support elements can overlap in a preferred manner during the conveying of products or product stacks. It can be achieved in an advantageous manner that products or product stacks are supported in an interruption-free manner between holders and counter holders. The feeding device can transport products or product stacks in a particularly gentle manner. In particular, it can be avoided that products or product stacks are pushed over a support surface. Friction and/or damage and/or rubbing of products or product stacks can be avoided. In particular, sticky and/or soft products or product stacks can be supplied which cannot be pushed over a standing surface. Sliding of products and/or product stacks over the non-moved support surface and/or product rubbing can be avoided. Contamination of the feeding device as a result of product rubbing can be reduced. Cleaning times and/or stoppage times can be reduced.

In addition, a control unit is proposed which is provided for the purpose of controlling and/or regulating a product length or product stack length and/or the separation between consecutive products or product stacks. A "control unit" is to be understood in this context in particular as an electric and/or electronic device of the feeding device which is provided for controlling and/or regulating drives of the feeding device. The control unit of the feeding device, in a preferred manner, can be part of a control unit of the packaging machine to which the feeding device supplies products or product stacks. In particular, the control unit can be provided for controlling the speed and regulating the position of the conveyor elements. Product length or product stack length and separation can be adjusted in an advantageous manner by the control unit. Format changes can be avoided. The feeding device can be particularly flexible.

In addition, it is proposed that the control unit is provided for the purpose of variably adjusting product lengths or product stack lengths and/or the separation of consecutive products or products stacks in the conveying direction. The term "variably" is to be understood in this context in particular as separation and/or product lengths or product stack lengths of consecutive products being able to be different. It is possible for consecutive products of different lengths to be packaged.

It is possible for consecutive product stacks of different lengths of a deviating product number to be packaged. In particular, it is possible to compensate for missing products and/or product stacks.

In addition, it is proposed that the control unit is provided for the purpose of determining product lengths or product stack lengths. The control unit can determine the product lengths or product stack lengths in particular by reducing a spacing between the holder and the counter holder until the product length of the product or product stack located between the holder and the counter holder is achieved. Resistance of the product or product stack on contact with the holder and the counter holder can transmit a pressing force between the holder and the counter holder. The control unit can be provided for the purpose of determining and/or evaluating the pressing force. The control unit can determine the force by means of control variables, in particular drive flows of the conveyor elements. The conveyor elements and/or holders and/or counter holders can have force measuring devices. Further devices can be present in order to determine contact between a product and/or product stack and the holder and the counter holder, in particular light barriers and/or proximity sensors. The control unit can adjust the feeding device automatically to product lengths or product stack lengths of supplied products. A format changeover can be omitted. Product lengths or product stack lengths can be variable. Adjustment of the feeding device and/or a forwarding of the product lengths or product stack lengths to the feeding device prior to the product receiving process can be omitted.

In addition, it is proposed that the control unit is provided for the purpose of moving at least one conveyor element in a direction opposite the conveying direction in at least one operating state. In particular, the control unit can be provided for the purpose of, when the product or product stack is discharged to the packaging process in the product discharging region, releasing the stack as a result of moving the holder back momentarily in the direction opposite the conveying direction. Descending the holder can be omitted. "Descending" the holder is to be understood in this context in particular as the holder being pulled back onto the side of the support surface remote from the products in order to release the product or the product stack. The feeding device can be constructed in a particularly simple manner. A device which brings about descent of the holder can be omitted. In addition, a conveyor element can be moved in the direction opposite the conveying direction in order to synchronize the conveyor elements with a to and fro movement of a product takeover device in the region of the product takeover. A spacing between the holder and counter holder can be enlarged during the product takeover. The product takeover can be particularly reliable. In a preferred manner, a conveyor element can be moved many times to and fro under a product transferring device, in particular a shaft, in order to take several products one after another from the product transferring device. In particular, a product stack can be formed as a result of multiple to and fro movements under a product transferring device. Products can be transferred in a particularly flexible manner. Different product configurations can be formed without changing over the product transferring device.

In addition, it is proposed that at least one portion of the guide unit is realized as a buffer portion. A "buffer portion" is to be understood in this context in particular as a region of the feed section between the product takeover region and the product discharging region which is provided for the purpose of intermediately storing a number of products and/or product stacks. In particular, products and/or product stacks can be accelerated or braked in the buffer portion in relation to a speed of the packaging process and/or feeding process in order to vary the number of products and/or product stacks in the buffer. In an advantageous manner, it is possible to compensate for oscillations between the product feed and the product discharge. In addition, at least one region of a return section of the conveyor elements can be realized as a buffer portion. A "return section" of the conveyor elements is to be understood in this context in particular as part of the guide unit between the product discharging region and the product takeover region which serves for the purpose of transporting the conveyor elements from the product discharging region to the product takeover region again. It can be ensured that a sufficient number of conveyor elements are available in front of the product takeover region.

It is further proposed that the guide unit includes at least one primary part and the conveyor elements in each case include at least one secondary part of a linear motor system. A "primary part" of a linear motor system is to be understood in this context in particular as a fixed stator of a linear motor which comprises solenoids. A "secondary part" of a linear motor system is to be understood in this context in particular as a movable part of a linear motor which is formed in a preferred manner by permanent magnets and corresponds to a rotor of a rotating motor. A "linear motor system" is to be understood in this context in particular as a system which consists of at least one primary part and a plurality of secondary parts which are able to move at least one primary part. In a preferred manner, the linear motor system has path measuring and positional measuring devices in order to determine the location and/or the speed of the secondary parts. Such linear motor systems are known to the expert. The conveyor elements can be drivable independently in a particularly simple and/or dynamic manner so as to be speed-controlled and/or positionally regulated. The feeding device can be particularly efficient. In a particularly preferred manner, support elements also include at least one secondary part of the linear motor system. The guide unit can include a primary part which extends along the entire circulation of the conveyor elements. In a preferred manner, in operating portions the guide unit includes at least one primary part which is provided for driving the conveyor elements in a speed-controlled and/or positionally regulated manner. In a preferred manner, portions of the circuit outside operating portions can include alternative drive devices for conveyor elements, in particular the conveyor elements can be driven in at least parts of such portions as a result of congestion and/or circulating conveying means, such as, for example, chains and/or wheels, as a result of frictional engagement and/or force engagement. Portions of the guide unit outside operating portions can be particularly cost-efficient. It is further proposed that the control unit is provided for the purpose of utilizing control variables, in particular drive flows of the conveyor elements and/or a control deviation of the conveyor elements, in particular of actual/required values of positions and/or speeds, for determining a maintenance state of the feeding device. In particular, drive flows and/or control deviations showing an increasing trend can be indications for contamination and/or wear of the feeding device and/or of changes in a magnetic gap between the primary and the secondary part and/or the loss and/or damage and/or weakening of magnets of the secondary part. In a preferred manner, the control unit can detect the beginnings of deterioration in the maintenance state in good time before failure of the feeding device. The maintenance state can be signaled to an operator such that maintenance measures can be introduced in good time. Unplanned stoppages of the feeding device as a result of lack of maintenance and/or faults can be reduced.

It is further proposed that the holders and/or counter holders are provided for the purpose of separating products and/or product stacks from a supplied product column. A "product column" is to be understood in this context in particular as an endless, in a preferred manner horizontal stack of products. The product column can consist, for example, of disk-shaped, horizontally stacked or shingled products, such as, for example, biscuits. In a preferred manner, the product column is supplied along a feed path. In a preferred manner, the holders and counter holders can separate products and/or product stacks from the product column by the holder and a counter holder following in a direction opposite the conveying direction being pushed between two products of the product column. The holder can separate a product and/or a product stack from the product column by being accelerated in relation to the counter holder and producing a spacing. The counter holder secures the end of the product column. Holders/counter holders following in the direction opposite the conveying direction can separate the next product stack. In a preferred manner, the counter holders of the conveying elements with counter holders are arranged on the conveying elements in an end region in the conveying direction. In a preferred manner, the holders of the conveyor elements with holders are arranged on the conveying elements in an end region in a direction opposite the conveying direction. An "end region" of the conveyor element is to be understood in this context in particular as a region which extends proceeding from an end of the conveyor element by less than 10%, in a preferred manner less than 5% of a length of the conveyor element in the direction of a center of the conveyor element. In a particularly preferred manner, the counter holders define the conveyor elements with counter holders in the conveying direction. In a particularly preferred manner, the holders define the conveyor elements with holders in a direction opposite the conveying direction. Holders and counter holders can be run together in this manner to form a particularly small spacing. Separating the product column as a result of pushing in a holder and a counter holder can be made simpler. The holder and/or counter holder can be mounted so as to be displaceable, in a preferred manner, in a direction perpendicular to the conveying direction. A linkage means and/or an actuator can be provided for the purpose of moving the holder between two products of the product column in the product takeover region. Holders and counter holders can be pushed in an advantageous manner between two products of the product column. In an advantageous development of the invention, the guide unit can guide the conveyor elements at least in part of the product takeover region along a path which approaches in a preferred manner from below with reference to the weight force along a conveying direction of the feed path of the product column. The conveyor elements and holders and counter holders can approach the products of the product column from below with reference to the weight force and be moved between two products of the product column in order to separate them. Actuators for moving the holders and/or counter holders to raise and/or lower the holders and/or counter holders on the conveyor elements or a linkage means can be omitted. In a particularly preferred manner, an actuator and/or a linkage means can be provided for the purpose of pivoting counter holders and/or holders by an angle in relation to the conveyor elements at least when being pushed-in. An optimum angle between the holders and/or counter holders and products of the product column can be ensured when the holder and/or counter holder is pushed in. In particular, the holder and/or counter holder can assume a right angle with respect to an end of the product column when pushed in. The product column is able to be separated in a particularly gentle manner.

In addition, a packaging machine with a feeding device is proposed. The packaging machine can be particularly efficient.

In addition, a method for feeding products or product stacks to a packaging machine with the feeding device having the described method features is proposed. Products or product stacks can be supplied with the described advantages.

BRIEF DESCRIPTION OF THE DRAWINGS

Further advantages are produced from the following description of the drawing. Exemplary embodiments of the invention are shown in the drawings. The drawings, the description and the claims include numerous features in combination. The expert will also consider the features individually in an expedient manner and combine them to form sensible further combinations.

The drawings are as follows.

DETAILED DESCRIPTION

Figure 1:
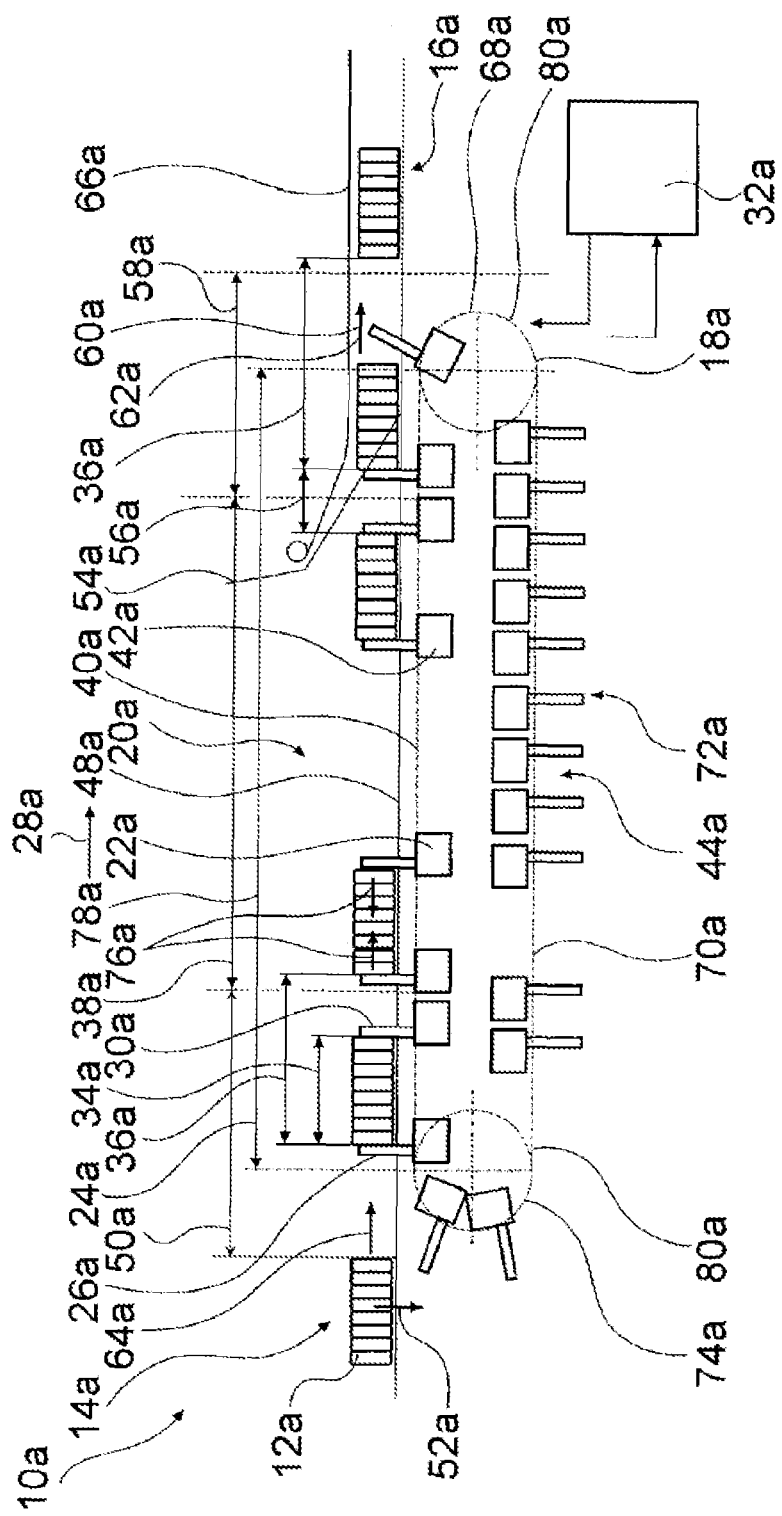
FIG. 1 shows a schematic representation of a first exemplary embodiment of a feeding device.

FIG. 1 shows a feeding device 10a for feeding products 12a or product stacks 14a to a packaging process of a packaging machine 16a, which is only indicated here, with a guide unit 20a which is realized as a closed loop 18a, along which a plurality of arranged conveyor elements 22a are arranged so as to be drivable independently of one another in a speed-controlled and/or positionally regulated manner along an operating portion 24a of the guide unit 20a in a conveying direction 28a and in a direction opposite a conveying direction. The conveyor elements 22a circulate around the guide unit 20a in the conveying direction 28a.

The feeding device 10a comprises a feed section 78a which is aligned in a packaging direction 62a and includes a product takeover region 50a, a buffer portion 38a and a product discharging region 58a. The conveyor elements 22a comprise in each case a holder 26a or a counter holder 30a. The products 12a to be packaged are pushed by a conveying system, not shown here in any detail, at a takeover speed 64a onto a support surface 48a into the product takeover region 50a of the feeding device 10a. The expert is familiar with different realizations of a suitable conveyor system, for example belt systems. A number of products 12a, in the example shown in each case 8, form in each case a product stack 14a which is horizontal in relation to a weight force 52a. The product stacks 14a comprise a product stack length 34a in the conveying direction 28a. The product stacks 14a are pushed along the support surface 48a in the conveying direction 28a by the holder 26a in each case at their end remote from the conveying direction 28a. The support surface 48a comprises a recess which is oriented in the conveying direction 28a, through which the holders 26a and counter holders 30a project. The holders 26a and counter holders 30a are synchronized with the delivered product stacks 14a at the product takeover. The position and speed of the conveyor elements 22a along the conveying direction 28a are regulated individually by a control unit 32a. The control unit 32a is provided for the purpose of controlling and regulating the product stack length 34a and a separation 36a between product stacks 14a which follow one another in the conveying direction 28a. The control unit 32a is provided for the purpose of determining the product stack lengths 34a. To this end, the control unit 32a reduces a spacing between the holder 26a and the counter holder 30a of a product stack 14a just until the product stack 14a, as soon as the spacing corresponds to the product stack length 34a, exerts resistance onto the holder 26a and the counter holder 30a. The resistance corresponds to a pressing force 76a between the holder 26a, the counter holder 30a and the product stack 14a. The pressing force 76a brings about an increase in drive flows necessary for driving the conveyor elements 22a, which is recognized by the control unit 32a and is utilized for determining the product stack length 34a. In order to synchronize the conveyor elements 22a, the control unit 32a has sensors, not shown here, by way of which it detects the takeover speed 64a and position of the delivered product stacks 14a and matches the speed and position of the conveyor elements 22a in a corresponding manner. An end of the product stack 14a that faces the conveying direction 28a is secured by a counter holder 30a. In the example shown, the holders 26a and counter holders 30a are realized in a structurally identical manner and differ in their function during the product feed. Each product stack 14a is thus conveyed between an independently driven holder 26a and counter holder 30a. Holders 26a following one after another in the conveying direction 28a comprise a spacing between products called a separation 36a. The separation 36a, together with the product stack length 34a, defines a remaining gap 56a between consecutive product stacks 14a. The separation 36a is adjusted independently by the control unit 32a in the product takeover region 50a, product discharging region 58a and buffer portion 38a. From the product takeover region 50a, the product stacks 14a are pushed between the holders 26a and counter holders 30a in the conveying direction 28a in the direction of the product discharging region 58a. The buffer portion 38a is arranged between the product takeover region 50a and product discharging region 58a. In the product discharging region 58a, the product stacks 14a are transferred to the packaging process in the packaging direction 62a in a positionally-synchronous manner at the separation 36a necessary for the packaging process and at a packaging speed 60a. In the region of the buffer portion 38a, the control unit 32a varies the separation 36a between the product stacks 14a in dependence on a fluctuation between the takeover speed 64a and packaging speed 60a. A length of the buffer portion 38a in the conveying direction 28a is designed by the expert such that a sufficient number of product stacks 14a are able to be buffered in the buffer portion 38a in order to compensate for the fluctuations that occur. In particular, so-called blank separations at the product takeover can be compensated for by the buffer portion 38a. When the feeding device 10a is not supplied with any products 12a, the conveyor elements 22a wait in the product takeover region 50a until the next products 12a are delivered. During this time product stacks 14a can continue to be output to the packaging machine 16a as long as product stacks 14a are available in the buffer portion 38a.

The packaging machine 16a is realized as a horizontal tube packaging machine. The feeding device 10a is arranged on the packaging machine 16a so as to be vertically adjustable in the direction of the weight force 52a. In the product takeover region 58a of the feeding device 10a, the packaging machine 16a forms a film tube 66a around the product stack 14a from a film web 54a. A turning region 68a of the feeding device 10a is arranged such that the counter holder 30a of the product stack 14a to be packaged is turned 180° downward about the turning region 68a onto a return section 70a of the feeding device 10a prior to sealing the film tube 66a with reference to the weight force 52a. The holder 26a releases the product stack 14a as soon as said product stack lies on the film tube 66a by being braked or moved briefly in opposition to the conveying direction 28a. The holder 26a is then also moved in the conveying direction 28a again and turned about the turning region 68a to the return section 70a. This avoids the holder 26a pressing against the product stack 14a and displacing it when turning. The return section 70a comprises a further buffer portion 72a which is provided for the purpose of buffering the conveyor elements 22a. A variable number of conveyor elements 22a is required for the conveying of the product stacks 14a from the product takeover region 50a as far as the product discharging region 58a in dependence on the separation 36a, the product stack length 34a and on a number of product stacks 14a in the buffer portion 38a. Surplus conveyor elements 22a are buffered in the buffer portion 72a. The conveyor elements 22a are conveyed along the return section 70a in a direction opposite the conveying direction 28a to a further turning region 74a and are turned once again by 180° into the product takeover region 50a through the turning region 74a synchronized with the delivered product stacks 14a.

To drive the conveyor elements 22a, the guide unit 20a includes primary parts 40a and the conveyor elements 22a include secondary parts 42a of a linear motor system 44a. In the conveying direction 28a along the feed section 78a and the return section 70a, the guide unit 20a comprises solenoids, which are not shown here in any detail, form poles of the linear motor system 44a and form in each case primary parts 40a. The solenoids can be actuated individually by the control unit 32a. The conveyor elements 22a also comprise permanent magnets, not shown in any detail either, and consequently the secondary part 42a of the linear motor system 40a. In addition, the guide unit 20a comprises a path measuring system, not shown in any detail, by way of which the speed and position of the conveyor elements 22a can be individually determined and transmitted to the control unit 32a. The control unit 32a can consequently regulate the position and speed of the conveyor elements 22a individually. Such linear motor systems 44a are known to the expert among other things from the named prior art. The turnings in the turning regions 68a and 74a are carried out in a passive manner. In the turning regions 68a and 74a the conveyor elements 22a are conveyed as a result of a force fit with rotating turning wheels 80a which are arranged in the turning regions 68a and 74a and are provided with magnets. The conveyor elements 22a then enter the feed section 78a or return section 70a again where they are drivable in a positionally regulated and speed-controlled manner by the control unit 32a. In order to save costs, it is also possible for the conveyor elements 22a to be moved in parts of the buffer portions 38a and/or 72a with congestion such that the primary part 40a of the linear motor system 44a can be interrupted in said regions. The expert will choose a realization of the linear motor system 44a that is favorable for the respective application.

The following description and the drawings of further exemplary embodiments is restricted essentially to the differences between the exemplary embodiments, reference being made in principle also to the drawings and/or the description of the other exemplary embodiments with regard to identically designated components, in particular with reference to components with identical references. To differentiate between the exemplary embodiments, in place of the letter a of the first exemplary embodiment, the letters b to k are placed after the further exemplary embodiments.

Figure 2:
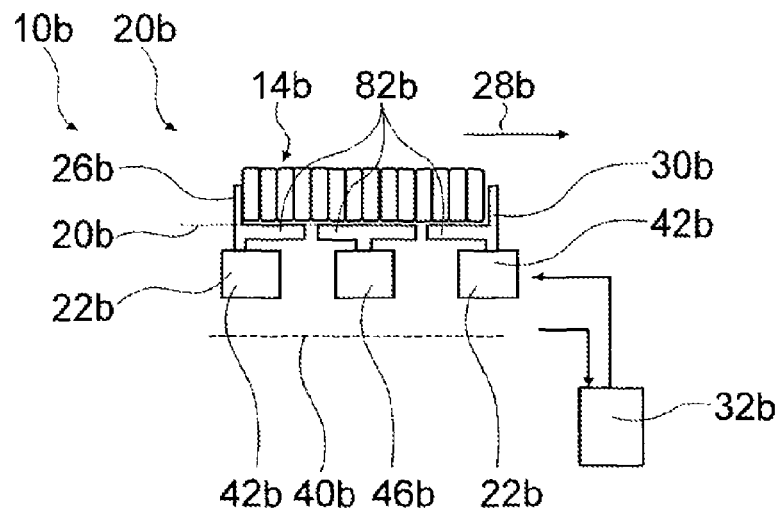
FIG. 2 shows a schematic representation of conveyor elements and a support element of a second exemplary embodiment of a feeding device.
Figure 3:
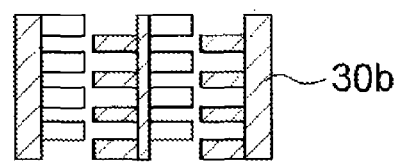
FIG. 3 shows a schematic representation of a top view of the conveyor elements and of the support element of the second exemplary embodiment.
Figure 3:
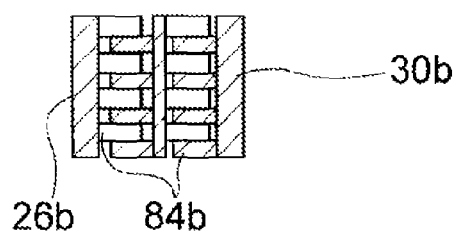
Figure 4:
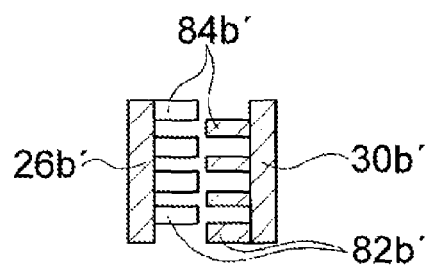
FIG. 4 shows a schematic representation of a top view of conveyor elements of a variant of the second exemplary embodiment.
Figure 4:
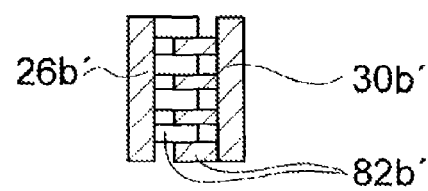

FIG. 2 and FIG. 3 show a detail of a second exemplary embodiment of a feeding device 10b with conveyor elements 22b with a holder 26b and a counter holder 30b. The conveying device 10b differs from the first exemplary embodiment in particular in that a support element 46b is arranged along a guide unit 20b between the conveyor elements 22b which comprise the holder 26b and the counter holder 30b. The support element 46b, as the conveyor elements 22b, is realized as the secondary part 42b of a linear motor system 44b and is drivable in a positionally regulated and speed-controlled manner by a control unit 32b. As an alternative to this, the support element 46b can also be arranged in a passive manner along the guide unit 20b and be pulled and/or pushed by the conveyor elements 22b. The support element 46b as well as the holder 26b and the counter holder 30b comprise support surfaces 82b by way of which they support product stacks 14b between the conveyor elements 22b. Closure edges, which face one another, of the support surfaces 82b of holders 26b, counter holders 30b and support element 46b are realized as meshing combs 84b (FIG. 3) such that the product stack 14b is supported continuously between the holder 26b and counter holder 30b. As a result of the combs 84b, different product stack lengths 34b can be adjusted between the holder 26b and counter holder 30b with continuous support. A support surface of the feeding device 10b, over which the product stacks 14b are pushed, can thus be omitted. The product stacks 14b are born in a gentle manner by the conveyor elements 22b and support elements 46b. FIG. 4 shows a variant of the second exemplary embodiment where the support element is omitted and holders 26b' and counter holders 30b' in each case comprise combs 84b' which form support surfaces 82b'. Said variant is suitable in particular for short product stack lengths.

Figure 5:
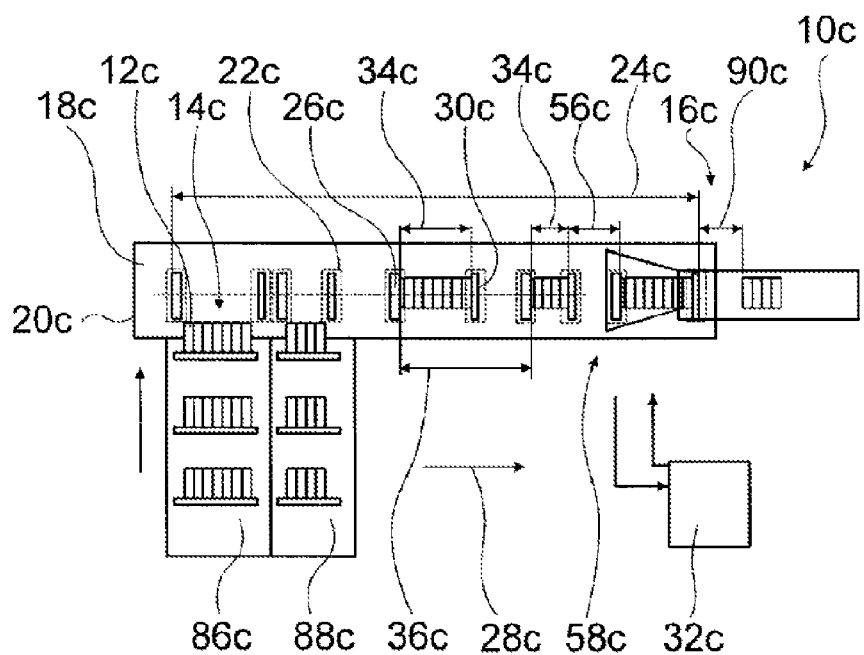
FIG. 5 shows a schematic representation of a third exemplary embodiment of a feeding device.

FIG. 5 shows a third exemplary embodiments of a feeding device 10c for feeding products 12c or product stacks 14c to a packaging process of a packaging machine 16c, which is only indicated here, having a guide unit 20c which is realized as a closed loop 18c, along which a plurality of arranged conveyor elements 22c are arranged so as to be drivable independently of one another in a speed-controlled and/or positionally regulated manner along an operating portion 24c of the guide unit 20c in a conveying direction 28c and in a direction opposite a conveying direction. The feeding device 10c differs from the first exemplary embodiment in particular in that a control unit 32c is provided for the purpose of variably adjusting product stack lengths 34c and a separation 36c of product stacks 14c which follow one another in the conveying direction 28c. Different length product stacks 14c are fed to the feeding device 10c by means of two cross chains 86c and 88c, in the example shown the cross chain 86c feeding product stacks 14c with in each case seven products 12c and the cross chain 88c product stacks 14c with in each case four products 12c. The cross chains 86c and 88c push the product stacks 14c in each case at right angles to the conveying direction 28c between holders 26c and counter holders 30c waiting at the correct spacing. As soon as the product stacks 14c have been pushed in, the conveyor elements 22c bearing the holders 26c and counter holders 30c convey the product stacks 14c in the conveying direction 28c to a product discharging region 58c, where they are taken over by a packaging machine 16c. The waiting holders 26c and counter holders 30c can be accelerated at increasing acceleration once the product stacks 14c have been taken over. The product stacks 14c can be treated in manner that is particular gentle to the products. The control unit 32c adjusts the separation 36c between consecutive holders 26c in a corresponding manner such that identical packaging spacings 90c are produced between the product stacks 14c and identical gaps 56c are produced between holders 26c and counter holders 30c. As an alternative to this, the product stacks 14c can also be transferred by a transferring device (not shown) to holders 26c and counter holders 30c by being already accelerated by the transferring device in the conveying direction 28c. The holders 26c and counter holders 30c do not have to be stopped such that a higher degree of packaging efficiency can be possible.

Figure 6:
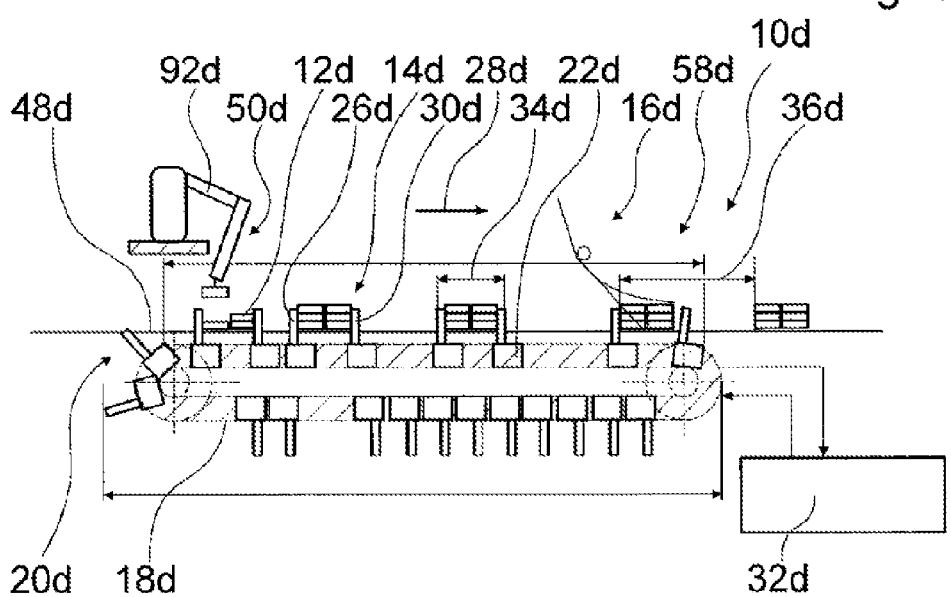
FIG. 6 shows a schematic representation of a fourth exemplary embodiment of a feeding device.

FIG. 6 shows a fourth exemplary embodiment of a feeding device 10d for feeding differs products 12d or product stacks 14d to a packaging process of a packaging machine 16d, which is only indicated here, having a guide unit 20d which is realized as a closed loop 18d, along which a plurality of arranged conveyor elements 22d are arranged so as to be drivable independently of one another in a speed-controlled and/or positionally regulated manner along an operating portion 24d of the guide unit 20d in a conveying direction 28d and in a direction opposite a conveying direction. The feeding device 10d differs from the first exemplary embodiment in particular in that holders 26d and counter holders 30d in each case convey two vertical product stacks 14d which are arranged side by side. In place of product stacks 14d, packages which lie side by side and can include product stacks can also be conveyed. Each of the product stacks 14d in the example shown comprise three products 12d. The product stacks 14d are made up by a loading robot 92d from individual products 12d in a product takeover region 50d between the holder 26d and the counter holder 30d on a support surface 48d of the feeding device 10d. It is also possible to stack a different number of products 12d on a product stack 14d or to arrange a different number of product stacks 14d side by side between the holder 26d and the counter holder 30d. A control unit 32d adapts a spacing between the holder 26d and the counter holder 30d to a corresponding product stack length 34d, the product stack length 34d also having to be understood as the extension of the product stacks 14d lying side by side in the conveying direction 28d. The spacing can also be adapted prior to, during and after each loading of product stacks 14d to the number of product stacks 14d already loaded. The spacing can also be slightly enlarged during loading such that more space is available during loading. The product stacks 14*d* conveyed between the holders 26*d* and counter holders 30*d* are transferred as a group to the packaging machine 16*d* and are packaged together in one package.

Figure 7:
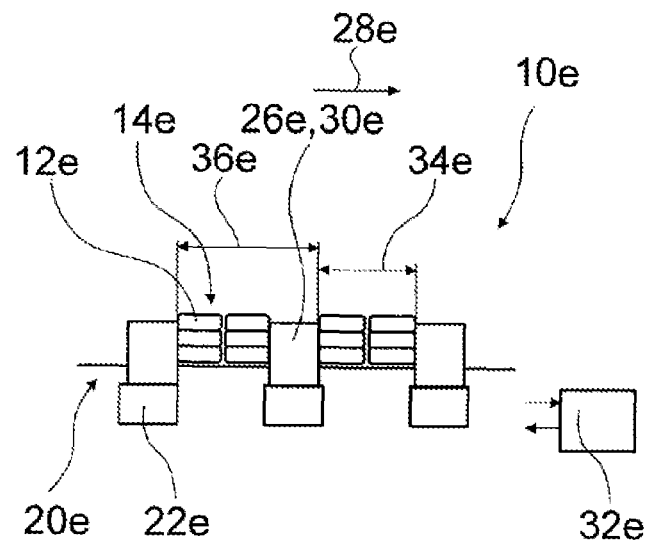
FIG. 7 shows a schematic representation of conveyor elements of a fifth exemplary embodiment of a feeding device.

FIG. 7 shows a detail of a fifth exemplary embodiment of a feeding device 10*e* with conveyor elements 22*e* with a holder 26*e* and a counter holder 30*e*. The conveying device 10*e* differs from the fourth exemplary embodiment in particular in that the conveyor elements 22*e* comprise in each case the holder 26*e* and the counter holder 30*e*, the holders 26*e* and counter holders 30*e* being realized integrally. A product stack length 34*e* in the conveying direction 28*e* can be adjusted individually by a control unit 32*e*, in dependence on a number of products 12*e* and/or product stacks 14*e* which are conveyed between the holder 26*e* and the counter holder 30*e*, both horizontal and vertical product stacks 14*e* being admissible. A separation 36*e* between consecutive holders 26*e* is determined in the case of the feeding device 10*e* by the product stack lengths 34*e* and is not adjustable in dependence on the product stack length 34*e*. The feeding device 10*e* requires only half the number of conveyor elements 22*e* compared to the feeding devices of the further exemplary embodiments.

Figure 8:
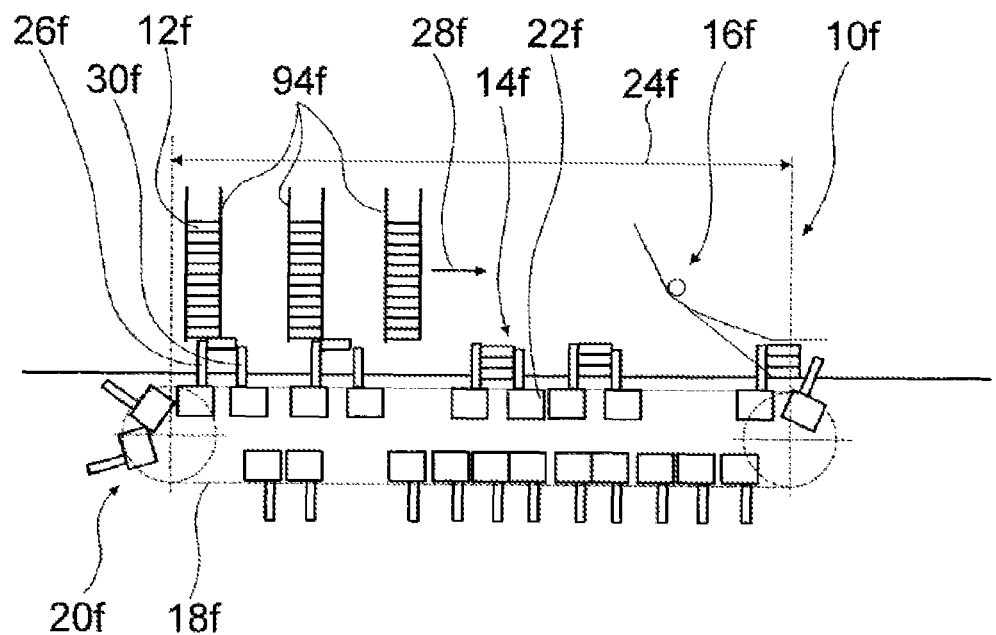
FIG. 8 shows a schematic representation of a sixth exemplary embodiment of a feeding device.

FIG. 8 shows a sixth exemplary embodiments of a feeding device 10*f* for feeding products 12*f* or product stacks 14*f* to a packaging process of a packaging machine 16*f*, which is only indicated here, with a guide unit 20*f* which is realized as a closed loop 18*f*, along which a plurality of arranged conveyor elements 22*f* are arranged so as to be drivable independently of one another in a speed-controlled and/or positionally regulated manner along an operating portion 24*f* of the guide unit 20*f* in a conveying direction 28*f* and in a direction opposite a conveying direction. The feeding device 10*f* differs from the feeding device 10*d* of the fourth exemplary embodiment in particular in that the products 12*f* are stacked up from three shafts 94*f* between the holders 26*f* and counter holders 30*f* to form vertical product stacks 14*f*, one product stack 14*f* being formed with three products 12*f* between each holder 26*f* and counter holder 30*f* in the example shown. Each of the three shafts 94*f*, in this case, contributes one product 12*f*, whilst the holders 26*f* and counter holders 30*f* convey the product stacks 14*f* past under the shafts 94*f* in the conveying direction 28*f*. The conveyor elements 22*f* stop the product stacks 14*f* briefly under the shafts 94*f* in order to make it simpler to pass the products 12*f* through the shafts 94*f*. The conveyor elements 22*f* then accelerate at increasing acceleration in order to treat the products 12*f* in a gentle manner. As an alternative to this, the holder 26*f* can remove a product 12*f* from the shaft 94*f* by braking briefly before touching the product 12*f* and accelerating again after touching. The products 12*f* are removed in a particularly gentle manner in this way. The spacing between the holders 26*f* and the counter holders 30*f* is preferably enlarged temporarily during removal from the shaft 94*f*. In addition, it is possible for a product stack 14*f* to be formed as a result of repeated removal of a product 12*f* from the shaft 94*f* with a reversing movement of the holder 26*f* from the shaft 94*f* in the conveying direction 28*f* and in a direction opposite the conveying direction. The counter holder 30*f* can also carry out a reversing movement.

Figure 9:
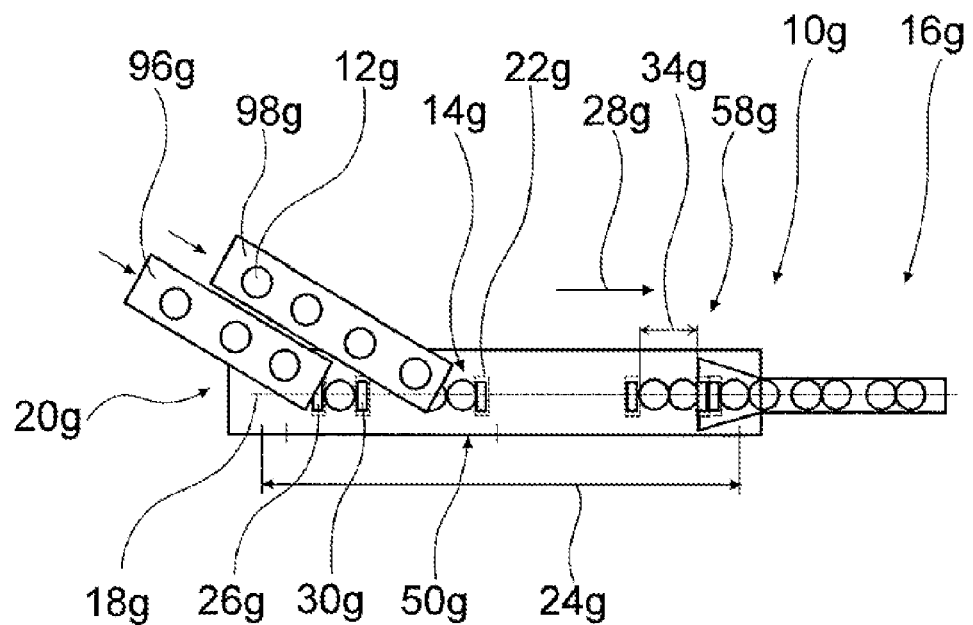
FIG. 9 shows a schematic representation of a seventh exemplary embodiment of a feeding device.

FIG. 9 shows a seventh exemplary embodiment of a feeding device 10*g* for feeding products 12*g* or product stacks 14*g* to a packaging process of a packaging machine 16*g*, which is only indicated here, with a guide unit 20*g* which is realized as a closed loop 18*g*, along which a plurality of arranged conveyor elements 22*g* are arranged so as to be drivable independently of one another in a speed-controlled and/or positionally regulated manner along an operating portion 24*g* of the guide unit 20*g* in a conveying direction 28*g* and in a direction opposite a conveying direction. The feeding device 10*g* differs from the feeding device 10*d* of the fourth exemplary embodiment in particular in that the products 12*g* are fed into the product takeover region 50*g* by two feed paths 96*g* and 98*g* which arranged diagonally with respect to the conveying direction 28*g*. First of all, a first product stack 14*g* is formed between a holder 26*g* and a counter holder 30*g* as a result of the feed path 96*g*. The product stack 14*g* is moved to the second feed path 98*g* by the holder 26*g* and counter holder 30*g*, as a result of which a spacing between the holder 26*g* and the counter holder 30*g* is enlarged such that a second product stack 14*g* is now able to be formed next to the first product stack 14*g* in the conveying direction 28*g*. A product stack length 34*g* now corresponds in the example shown to two products 12*g* lying side by side. The product stacks 14*g* are fed further as described to the packaging machine 16*g*. As an alternative to this, a product stack 14*g* can also be formed by each of the feed paths 96*g* and 98*g* one after another passing one product 12*g* between a holder 26*g* and a counter holder 30*g*.

Figure 10:
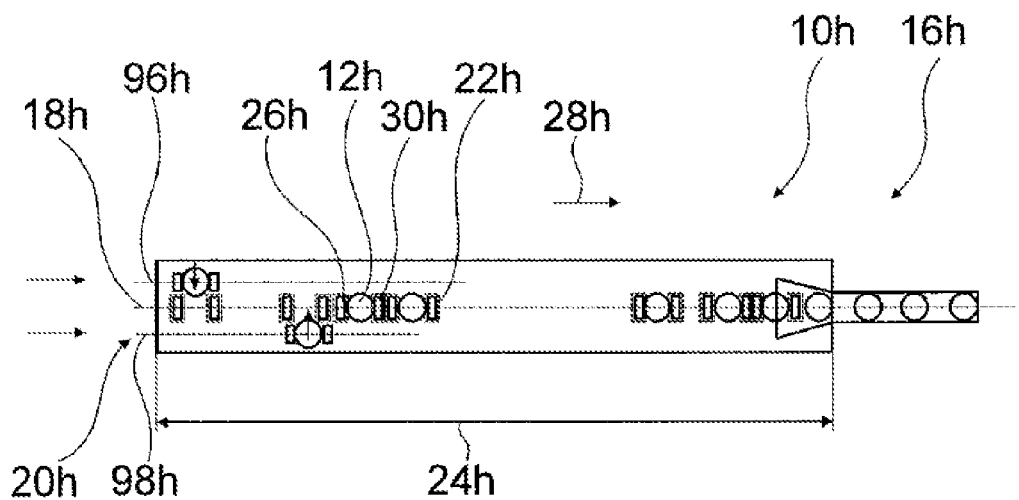
FIG. 10 shows a schematic representation of a eighth exemplary embodiment of a feeding device.

FIG. 10 shows an eighth exemplary embodiments of a feeding device 10*h* for feeding products 12*h* to a packaging process of a packaging machine 16*h*, which is only indicated here, with a guide unit 20*h* which is realized as a closed loop 18*h*, along which a plurality of arranged conveyor elements 22*h* are arranged so as to be drivable independently of one another in a speed-controlled and/or positionally regulated manner along an operating portion 24*h* of the guide unit 20*h* in a conveying direction 28*h* and in a direction opposite a conveying direction. The feeding device 10*h* differs from the feeding device 10*g* of the seventh exemplary embodiment in particular in that the products 12*h* are pushed by two feed paths 96*h* and 98*h*, which are arranged at the sides of the conveyor elements 22*h* in relation to the conveying direction 28*h*, transversely between the holder 26*h* and counter holder 30*h*. The products 12*h* of the two feed paths 96*h* and 98*h* are combined in this manner. In the example shown, no product stacks are formed, instead of which in each case one single product 12*h* is moved between the holder 26*h* and counter holder 30*h* which is packaged by the packaging machine 16*h*. As an alternative to this, the feed paths 96*h* and 98*h* can feed product stacks which are moved in the manner shown between the holder 26*h* and counter holder 30*h*.

Figure 11:
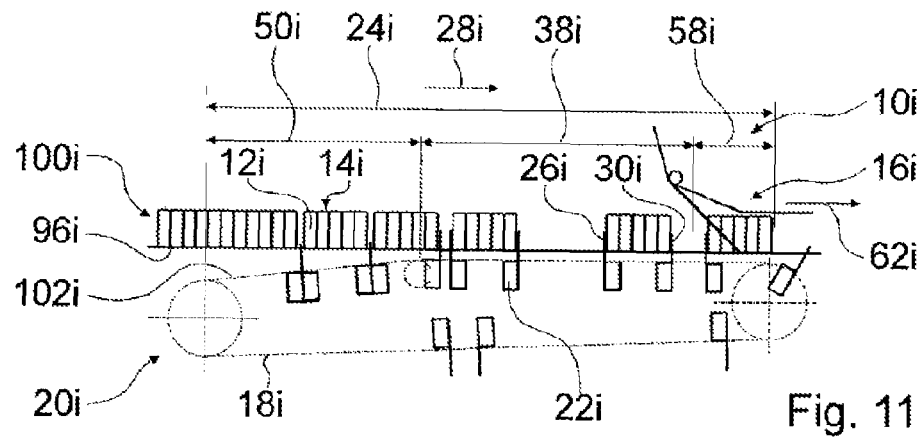
FIG. 11 shows a schematic representation of a ninth exemplary embodiment of a feeding device.

FIG. 11 shows a ninth exemplary embodiments of a feeding device 10*i* for feeding products 12*i* or product stacks 14*i* to a packaging process of a packaging machine 16*i*, which is only indicated here, with a guide unit 20*i* which is realized as a closed loop 18*i*, along which a plurality of arranged conveyor elements 22*i* are arranged so as to be drivable independently of one another in a speed-controlled and/or positionally regulated manner along an operating portion 24*i* of the guide unit 20*i* in a conveying direction 28*i* and in a direction opposite a conveying direction. The feeding device 10*i* differs from the first exemplary embodiment in particular in that the holders 26*i* and counter holders 30*i* are provided for the purpose of separating product stacks 14*i* from a supplied product column 100*i*. The endless product column 100*i* is supplied along a feed path 96*i* parallel to a packaging direction 62*i*. In a product takeover region 50*i*, the guide unit 20*i* guides the conveyor elements 22*i* along a path 102*i* which approaches the feed path 96*i* along the conveying direction 28*i*. The conveyor elements 22*i* with a holder 26*i* and conveyor elements 22*i* following in each case in the conveying direction with a counter holder 30*i* are merged in the product takeover region 50*i* such that holders 26*i* and counter holders 30*i* touch one another. The holders 26*i* define the conveyor elements 22*i* with holders 26*i* in opposition to the conveying direction 28*i*. The counter holders 30*i* define the conveyor elements 22*i* with counter holders 30*i* in the conveying direction 28*i*. The holders 26*i* and counter holders 30*i* approach the product column 100*i* until the holders 26*i* and counter holders 30*i* are pushed between two products 12*i* of the product column 100*i*. The holder 26*i* then separates a product stack 14*i* by the holder 26*i* and the counter holder 30*i*, which follows the holder 26*i* in the conveying direction 28*i* and abuts against the product stack 14*i*, being accelerated in the conveying direction 28*i* such that a spacing is created between the product stack 14*i* and the product column 100*i*. The next counter holder 30*i* arranged from the holder 26*i* in opposition to the conveying direction 28*i* secures the end of the product column 100*i* and forms the next product stack 14*i* with the next holder 26*i* in opposition to the conveying direction 28*i*. It is also possible to separate individual products 12*i* in the same way. In the region of the buffer portion 38*i* and of a product discharging region 58*i* which follows in the conveying direction 28*i*, the guide unit 20*i* supplies the conveyor elements 22*i* parallel to the packaging direction 62*i* further to the packaging process.

Figure 12:
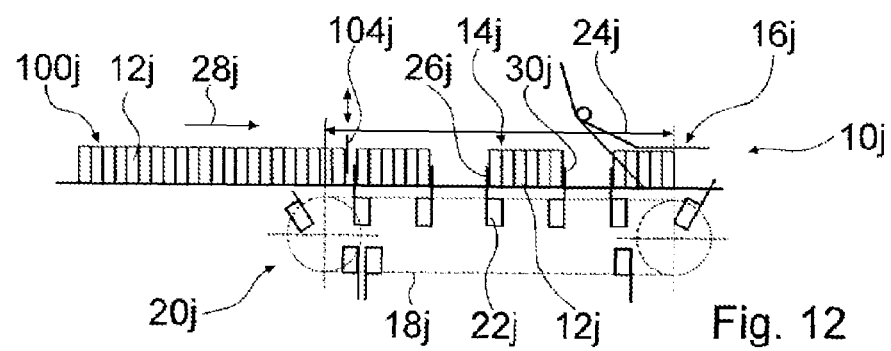
FIG. 12 shows a schematic representation of a tenth exemplary embodiment of a feeding device.

FIG. 12 shows a tenth exemplary embodiment of a feeding device 10*j* for feeding products 12*j* or product stacks 14*j* to a packaging process of a packaging machine 16*j*, which is only indicated here, with a guide unit 20*j* which is realized as a closed loop 18*j*, along which a plurality of arranged conveyor elements 22*j* are arranged so as to be drivable independently of one another in a speed-controlled and/or positionally regulated manner along an operating portion 24*j* of the guide unit 20*j* in a conveying direction 28*j* and in a direction opposite a conveying direction. The feeding device 10*j* differs from the first exemplary embodiment in particular in that a separating blade 104*j* is provided for the purpose of separating products stacks 14*j* from a supplied product column 100*j*. The separating blade 104*j* is inserted between two products 12*j* of the product column 100*j* from the side that is remote from the guide unit 20*j*. The holders 26*j* and counter holders 30*j* are arranged on the conveyor elements 22*j* so as to be lowerable in the direction of the conveyor elements 22*j* by means of a linkage means (not shown here). In a product transferring region 50*j*, an end of the product column 100*j* which faces the conveying direction 28*j* is secured by the separating blade 104*j*. A counter holder 30*j* is placed onto the end. The separating blade 104*j* is pulled back in the direction of the side of the product column 100*j* which is remote from the guide unit 20*j*. The product column 100*j* is moved with the counter holder 30*j* in the conveying direction 28*j* until a number of products 12*j* corresponding to a product stack 14*j* is achieved. The separating blade 104*j* is moved in between two products 12*j* of the product column 100*j* and secures the end of the product column 100*j*. A holder 26*j*, which follows the counter holder 30*j* of the separated product stack 14*j* against the conveying direction 28*j*, is extended in the direction of the product stack 14*j* and secures the product stack 14*j*, whilst the counter holder 30*j* following against the conveying direction 28*j* is also extended in the direction of the product stack 14*j* and secures the new end of the product column 100*j* such that the separating blade 104*j* is able to be pulled back again. During a period in which the separating blade 104*j* is retracted into the product column 100*j*, the end of the product column 100*j* is stopped by the separating blade 104*j*. The holders 26*j* and counter holders 30*j* of the product stack 14*j* to be separated are accelerated by the conveyor elements 22*j* in the conveying direction 28*j* and the product stack 14*j* separated. The further product stacks 14*j* are formed in a corresponding manner.

Figure 13:
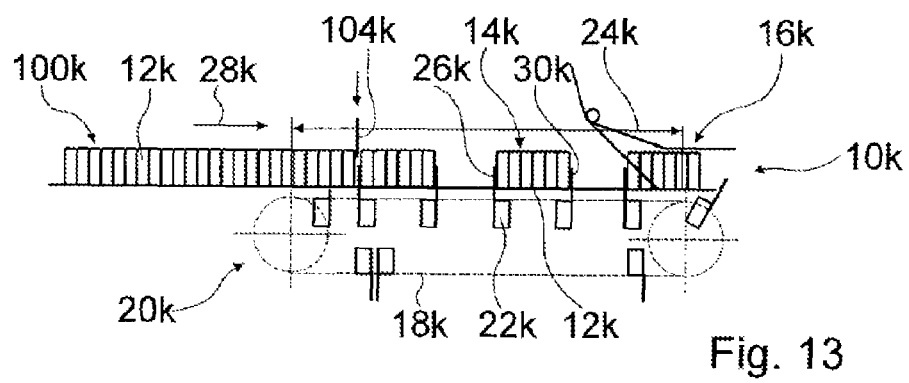
FIG. 13 shows a schematic representation of an eleventh exemplary embodiment of a feeding device and FIG. 14 shows a further schematic representation of the eleventh exemplary embodiment of the feeding device.
Figure 14:
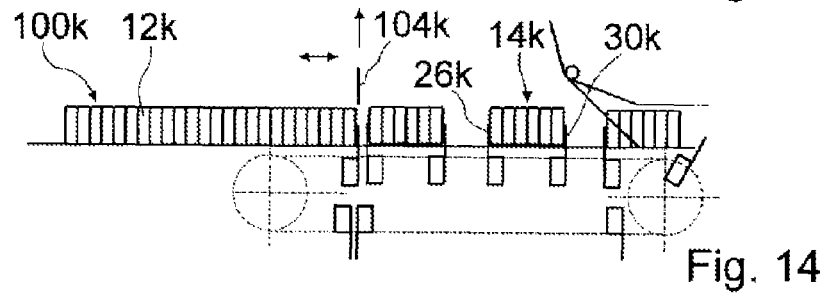

FIG. 13 and FIG. 14 show an eleventh exemplary embodiment of a feeding device 10*k* for feeding products 12*k* or product stacks 14*k* to a packaging process of a packaging machine 16*k*, which is only indicated here, with a guide unit 20*k* which is realized as a closed loop 18*k*, along which a plurality of arranged conveyor elements 22*k* are arranged so as to be drivable independently of one another in a speed-controlled and/or positionally regulated manner along an operating portion 24*k* of the guide unit 20*k* in a conveying direction 28*k* and in a direction opposite a conveying direction. The feeding device 10*k* differs from the tenth exemplary embodiment in particular in that a separating blade 104*k* is mounted so as to be movable in the conveying direction 28*k*. The separating blade 104*k* is pushed between two products 12*k* of the product column 100*k* and at the same time is moved with the product column 100*k* in the conveying direction 28*k*. A holder 26*k* is pushed from the side located opposite the separating blade 104*k* between products 12*k* of the product column 100*k* that have been separated by the separating blade 104*k* (FIG. 13). The holder 26*k* together with a counter holder 30*k*, which follows the separated product stack 14*k* in the conveying direction 28*k*, accelerates the product stack 14*k* in the conveying direction 28*k*. A counter holder 30*k* which follows against the conveying direction 28*k* is applied to the new end of the product column 100*k* (FIG. 14). The separating blade 104*k* is pulled back and moved against the conveying direction 28*k*. The separating blade 104*k* separates the product column 100*k* between two products 12*k* once again, as a result of which the holder 26*k* following against the conveying direction 28*k* is inserted into the position of the product column 100*k* separated by the separating blade 104*k* and a new product stack 14*k* is formed. The product column 100*k* can remain in motion in the conveying direction 28*k* during the separating operations by the separating blade 104*k* and the holders 26*k* as well as the counter holders 30*k* being moved together in a synchronous manner in the conveying direction.

What is claimed is:

1. A feeding device for feeding products (12*a-k*) and/or product stacks (14*a-k*) to a packaging process of a packaging machine (16*a*, 16*d-k*), said feeding device having a guide unit (20*a-k*) which is a closed loop (18*a*, 18*c-k*) along which a plurality of arranged conveyor elements (22*a-k*) are arranged so as to be drivable in a speed-controlled and/or positionally regulated manner independently of one another at least along at least one operating portion (24*a*, 24*c-d*, 24*f-k*) of the guide unit (20*a-k*), wherein at least one conveyor element (22*a-k*) comprises a holder (26*a-k*), and at least one conveyor element (22*a-k*) which follows in a conveying direction (28*a*, 28*c-k*) comprises a counter holder (30*a-k*), and the feeding device having a control unit (32*c-d*, 32*f-h*) programmed to control and regulate a spacing between the holder (26*c-d*, 26*f-h*) and the counter holder (30*c-d*, 30*f-h*) in accordance with a product stack length (34*c-d*, 34*f-h*), wherein, during loading, the spacing between the holder (26*c-d*, 26*f-h*) and the counter holder (30*c-d*, 30*f-h*) is increased.

2. The feeding device as claimed in claim 1, characterized in that at least one conveyor element (22*e*) comprises at least one holder (26*e*) and at least one counter holder (30*e*).

3. The feeding device as claimed in claim 1, characterized by at least one support element (46*b*) which is arranged on the guide unit (20*b*) between two conveyor elements (22*b*).

4. The feeding device as claimed in claim 1, characterized by a control unit (32*a-e*) which is configured for controlling and/or regulating a product length or product stack length (34*a*, 34*c-e*, 34*g*) and/or a separation (36*a*, 36*c-e*) between products (12*a*, 12*c-k*) or product stacks (14*a-k*) which follow one after another in the conveying direction (28*a*, 28*c-k*).

5. The feeding device as claimed in claim 4, characterized in that the control unit (32a-e) is configured for variably adjusting product lengths or product stack lengths (34a, 34c-e, 34g) and/or the separation (36a, 36c-e) of products (12a, 12c-k) or product stacks (14a-k) which follow one after another in the conveying direction (28a, 28c-k).

6. The feeding device at least as claimed in claim 4, characterized in that the control unit (32a-e) is configured for determining product lengths or product stack lengths (34a, 34c-e, 34g).

7. The feeding device at least as claimed in claim 4, characterized in that the control unit (32a-e) is configured for moving at least one conveyor element (22a-k) in a direction opposite to the conveying direction (28a, 28c-k) in at least one operating state.

8. The feeding device as claimed in claim 1, characterized in that at least one portion of the guide unit (20a-d, 20f-k) is a buffer portion (38a, 38i, 72a).

9. The feeding device as claimed in claim 1, characterized in that the guide unit (20a-d, 20f-h) includes at least one primary part (40a-b) and the conveyor elements (22a-k) include in each case at least one secondary part (42a-b) of a linear motor system (44a).

10. The feeding device as claimed in claim 1, characterized in that the holders (26i) and/or counter holders (30i) are provided for the purpose of configured for separating products (12i) and/or product stacks (14i) from a supplied product column (100i).

11. A packaging machine having a feeding device (10a-k) as claimed in claim 1.

12. A method for feeding products (12a-k) or product stacks (14a-k) to a packaging machine (16a, 16d-k), the method comprising:
providing a feeding device having a guide unit (20a-k) which is a closed loop (18a, 18c-k) along which a plurality of arranged conveyor elements (22a-k) are arranged so as to be drivable in a speed-controlled and/or positionally regulated manner independently of one another at least along at least one operating portion (24a, 24c-d, 24f-k) of the guide unit (20a-k), wherein at least one conveyor element (22a-k) comprises a holder (26a-k), and at least one conveyor element (22a-k) which follows in a conveying direction (28a, 28c-k) comprises a counter holder (30a-k);
controlling a spacing between the holder (26c-d, 26f-h) and the counter holder (30c-d, 30f-h) in accordance with a product stack length (34c-d, 34f-h);
increasing the spacing between the holder (26c-d, 26f-h) and the counter holder (30c-d, 30f-h) during loading; and
using the feeding device to feed the products (12a-k) or product stacks (14a-k) to the packaging machine (16a, 16d-k).

* * * * *